United States Patent
Kim et al.

(10) Patent No.: US 12,224,397 B2
(45) Date of Patent: Feb. 11, 2025

(54) CAPSULE FOR LITHIUM-SULFUR SECONDARY BATTERY AND LITHIUM-SULFUR SECONDARY BATTERY COMPRISING SAME

(71) Applicant: LG ENERGY SOLUTION, LTD., Seoul (KR)

(72) Inventors: Kihyun Kim, Daejeon (KR); Sangryeo Lee, Daejeon (KR); Lucia Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 512 days.

(21) Appl. No.: 17/636,296

(22) PCT Filed: Jun. 8, 2021

(86) PCT No.: PCT/KR2021/007156
§ 371 (c)(1),
(2) Date: Feb. 17, 2022

(87) PCT Pub. No.: WO2021/256763
PCT Pub. Date: Dec. 23, 2021

(65) Prior Publication Data
US 2022/0294002 A1    Sep. 15, 2022

(30) Foreign Application Priority Data
Jun. 17, 2020   (KR) .......................... 10-2020-0073348

(51) Int. Cl.
*H01M 10/056*    (2010.01)
*H01M 10/0525*   (2010.01)
*H01M 10/0567*   (2010.01)

(52) U.S. Cl.
CPC ..... *H01M 10/056* (2013.01); *H01M 10/0525* (2013.01); *H01M 10/0567* (2013.01); *H01M 2300/0065* (2013.01)

(58) Field of Classification Search
CPC .......... H01M 10/056; H01M 10/0525; H01M 2300/0065
See application file for complete search history.

(56) References Cited

U.S. PATENT DOCUMENTS

| | | | |
|---|---|---|---|
| 10,804,537 B2 * | 10/2020 | Zhamu | H01M 4/366 |
| 2005/0288433 A1 | 12/2005 | Chen et al. | |

(Continued)

FOREIGN PATENT DOCUMENTS

| | | |
|---|---|---|
| CN | 101213703 A | 7/2008 |
| CN | 105140449 A | 12/2015 |

(Continued)

OTHER PUBLICATIONS

International Search Report for PCT/KR2021/007156 (PCT/ISA/210) mailed on Sep. 13, 2021.

(Continued)

*Primary Examiner* — Matthew J Merkling
(74) *Attorney, Agent, or Firm* — Birch, Stewart, Kolasch & Birch, LLP (57) ABSTRACT

A capsule for a lithium-sulfur secondary battery, wherein the capsule includes a core containing a material required for formation and restoration of a solid electrolyte interface layer (SEI layer) and a shell including a polymer surrounding the core. The shell maintains the material required for formation and restoration of the solid electrolyte interface layer (SEI layer) at a constant level during operation of the battery, thereby exhibiting the effect of maintaining the solid electrolyte interface layer (SEI layer) on the negative electrode for a long time.

18 Claims, 4 Drawing Sheets

(56) References Cited

U.S. PATENT DOCUMENTS

| | | |
|---|---|---|
| 2006/0128835 A1 | 6/2006 | Usui et al. |
| 2007/0015048 A1 | 1/2007 | Lee et al. |
| 2011/0129729 A1 | 6/2011 | Kim et al. |
| 2014/0045065 A1* | 2/2014 | Bao ............... H01M 4/134 252/500 |
| 2015/0093635 A1 | 4/2015 | Grimminger et al. |
| 2016/0066568 A1 | 3/2016 | Lu et al. |
| 2016/0126582 A1 | 5/2016 | Xiao et al. |
| 2018/0159171 A1 | 6/2018 | Narayan et al. |
| 2019/0157714 A1* | 5/2019 | Song ............... H01M 4/0416 |
| 2019/0322538 A1 | 10/2019 | Liu et al. |
| 2019/0372123 A1 | 12/2019 | Kang et al. |
| 2020/0350570 A1 | 11/2020 | Kim et al. |
| 2022/0131135 A1* | 4/2022 | Kang ............... H01M 4/1395 |
| 2023/0246295 A1* | 8/2023 | Xiao ............... H01M 50/451 429/144 |

FOREIGN PATENT DOCUMENTS

| | | |
|---|---|---|
| CN | 107665974 A | 2/2018 |
| CN | 111066177 A | 4/2020 |
| JP | 2009-201419 A | 1/2009 |
| JP | 6279241 B2 | 2/2018 |
| JP | 2018-518026 A | 7/2018 |
| KR | 10-2007-0008405 A | 1/2007 |
| KR | 10-0809799 B1 | 3/2008 |
| KR | 10-2008-0037213 A | 4/2008 |
| KR | 10-2008-0064921 A | 7/2008 |
| KR | 10-2009-0011598 A | 2/2009 |
| KR | 10-1156964 B1 | 6/2012 |
| KR | 10-2016-0010460 A | 1/2016 |
| KR | 10-2019-0056121 A | 5/2019 |
| KR | 10-2019-0062760 A | 6/2019 |
| WO | WO 2019/098550 A2 | 5/2019 |

OTHER PUBLICATIONS

Lim et al., "Time Release of Encapsulated Additives for Enhanced Performance of Lithium-Ion Batteries", ACS Applied Materials & Interfaces, 2017, 9, pp. 40244-40251.

Liu et al., "Solubility-mediated sustained release enabling nitrate additive in carbonate electrolytes for stable lithium metal anode", Nature Communications (2018)9:3656, pp. 1-10.

Extended European Search Report for European Application No. 21825462.1, dated Sep. 21, 2023.

Widmann et al., "Encapsulation of Levitated Microparticles," Journal of Colloid and Interface Science, vol. 199, No. 2, Mar. 1, 1998, XP055051050A, pp. 197-205.

* cited by examiner

<Capsule for lithium-sulfur secondary battery according to Example 1>

<Pure LiNO$_3$>

CAPSULE FOR LITHIUM-SULFUR SECONDARY BATTERY AND LITHIUM-SULFUR SECONDARY BATTERY COMPRISING SAME

TECHNICAL FIELD

The present invention relates to a capsule for a lithium-sulfur secondary battery.

The present application claims the benefit of priority based on Korean Patent Application No. 10-2020-0073348 filed on Jun. 17, 2020, the entire contents of which are incorporated herein by reference.

BACKGROUND ART

Recently, as the trend for miniaturization, weight reduction, and high performance of electronic devices and communication devices are rapidly progressing and the need for electric vehicles has risen significantly in relation to an environmental problem, there is a growing demand for improvement in the performance of secondary batteries used as a power source for these products. As a secondary battery that satisfies these requirements, many studies on a lithium-sulfur battery using sulfur-based materials as positive electrode active materials have been conducted.

The lithium-sulfur battery is a secondary battery using a sulfur-based compound having a sulfur-sulfur bond as a positive electrode active material and using, as a negative electrode active material, an alkali metal such as lithium or a carbon-based material in which intercalation/deintercalation of metal ions such as lithium ions occurs.

In particular, the theoretical discharging capacity of the lithium-sulfur battery is 1,675 mAh/g, and its theoretical energy density is 2,600 Wh/kg. The lithium-sulfur battery has a theoretical energy density that is about 5 times higher than that of a lithium-ion battery (about 570 Wh/kg) currently being researched, so it is a battery capable of realizing high capacity, high energy density, and long lifetime. In addition, since there is an advantage that sulfur, which is the main material of the positive electrode active material, has a low atomic weight, is very rich in resources and thus easy to supply and receive, and is cheap, non-toxic and environmentally friendly, the lithium-sulfur battery is attracting attention as an energy source for medium-to-large devices such as electric vehicles as well as portable electronic devices.

In a lithium-sulfur secondary battery, lithium metal is used as a negative electrode, and in order to protect the lithium metal negative electrode, an additive is added to the electrolyte solution, and a solid electrolyte interface layer (SEI layer) is formed by the reaction of the additive with the lithium metal. However, in such a lithium-sulfur secondary battery, when charging and discharging are repeated, the solid electrolyte interface layer (SEI layer) on the negative electrode is damaged, and lithium metal is exposed, and as a result, the efficiency of the battery is rapidly reduced, and the discharging capacity is lowered, leading to deterioration of the battery.

In order to prevent such damage to the solid electrolyte interface layer (SEI layer) of the negative electrode, if the content of a material (additive) that can simply form and restore the solid electrolyte interface layer (SEI layer) as a component of the battery is increased, the additive may act as a resistor in the battery, thereby becoming a cause of lowering the energy density and shortening the lifespan.

Therefore, in order to prevent damage to the solid electrolyte interface layer (SEI layer) and to maintain the solid electrolyte interface layer (SEI layer) at a constant level, there is a need for a method for maintaining the content of a material capable of forming and restoring the solid electrolyte interface layer (SEI layer) at a constant level, even during the operation of the lithium-sulfur secondary battery.

PRIOR ART DOCUMENT

Patent Document (Patent Document 1) Korean Laid-open Patent Publication No. 10-2007-0008405 (Jan. 17, 2007) "Lithium Secondary Battery Containing Capsule for Controlled-release of Additives"

DISCLOSURE

Technical Problem

Therefore, the inventors of the present invention have discovered that in the negative electrode of the lithium-sulfur secondary battery, the damage of the solid electrolyte interface layer (SEI layer) on the negative electrode is prevented even during operation of the lithium-sulfur secondary battery, thereby preventing the lithium metal from being exposed to the electrolyte solution and thus suppressing the sudden drop in the efficiency of the battery and suppressing the degradation of the discharging capacity, by using a capsule containing a core containing a material capable of forming and restoring a solid electrolyte interface layer (SEI layer) and a shell made of a polymer surrounding the core, as an additive for the lithium-sulfur secondary battery that maintains the material (additive) at a constant level, which can reacts with lithium metal during operation of lithium-sulfur secondary battery and thus can form and restore the solid electrolyte interface layer (SEI layer) on the negative electrode, and thus have completed the present invention.

Therefore, it is an object of the present invention to provide a capsule for a lithium-sulfur secondary battery capable of improving the lifetime characteristic of the lithium-sulfur secondary battery by preventing damage to the solid electrolyte interface layer (SEI layer) formed on the negative electrode of the lithium-sulfur secondary battery and a method for preparing the same. In particular, it is the object of the present invention to provide a capsule for a lithium-sulfur secondary battery capable of maintaining a solid electrolyte interface layer (SEI layer) on a negative electrode by continuously supplying a material (additive) at a constant level, which can form and restore the solid electrolyte interface layer (SEI layer), and a method for preparing the same.

In addition, it is another object of the present invention to provide a lithium-sulfur secondary battery comprising the capsule.

Technical Solution

In order to achieve the above objects, the present invention provides a capsule for a lithium-sulfur secondary battery comprising a core containing a material required for formation and restoration of a solid electrolyte interface layer (SEI layer) and a shell made of a polymer surrounding the core.

In addition, the present invention provides a capsule for a lithium-sulfur secondary battery, wherein the material required for formation and restoration of the solid electrolyte interface layer (SEI layer) is at least one selected from the group consisting of $LiNO_3$, $Be(NO_3)_2$, $NaNO_3$, $Mg(NO_3)_2$, $Al(NO_3)_3$, $KNO_3$, $Ca(NO_3)_2$, $Sc(NO_3)_3$, $Ti(NO_3)_4$, $VO(NO_3)_3$, $Cr(NO_3)_3$, $Mn(NO_3)_2$, $Fe(NO_3)_3$, $Fe(NO_3)_2$, $Co(NO_3)_2$, $Co(NO_3)_3$, $Ni(NO_3)_2$, $Cu(NO_3)_2$, $Zn(NO_3)_2$, $Ga(NO_3)_3$, $RbNO_3$, $Sr(NO_3)_2$, $Y(NO_3)_3$, $Zr(NO_3)_4$, $Pd(NO_3)_2$, $AgNO_3$, $Cd(NO_3)_2$, $Sb(NO_3)_3$, $Xe(NO_3)_2$, $CsNO_3$, $Ba(NO_3)_2$, $Hg_2(NO_3)_2$, $Hg(NO_3)_2$, $Tl(NO_3)_3$, $TlNO_3$, $Pb(NO_3)_2$, $Bi(NO_3)_3$, $BiO(NO_3)$, $FrNO_3$, $Ra(NO_3)_2$, $La(NO_3)_3$, $Ce(NO_3)_3$, $Ce(NO_3)_4$, $Nd(NO_3)_3$, $Eu(NO_3)_3$, $Gd(NO_3)_3$, and $Tb(NO_3)_3$.

In addition, the present invention provides a capsule for a lithium-sulfur secondary battery, wherein the polymer is formed by crosslinking an epoxy compound having two or more epoxy groups and a crosslinking agent having two or more amino groups.

In addition, the present invention provides a capsule for a lithium-sulfur secondary battery, wherein the epoxy compound having two or more epoxy groups is at least one selected from the group consisting of 1,4-butanediol diglycidyl ether (BDDE), ethylene glycol diglycidyl ether (EGDGE), 1,6-hexanediol diglycidyl ether, propylene glycol diglycidyl ether, poly(propylene glycol)diglycidyl ether, poly(tetramethylene glycol)diglycidyl ether, neopentyl glycol diglycidyl ether, trimethylolpropane triglycidyl ether, polyglycerol polyglycidyl ether, diglycerol polyglycidyl ether, glycerol polyglycidyl ether, trimethylolpropane polyglycidyl ether, 1,2-bis(2,3-epoxypropoxy)ethane, pentaerythritol polyglycidyl ether, or sorbitol polyglycidyl ether.

In addition, the present invention provides a capsule for a lithium-sulfur secondary battery, wherein the crosslinking agent having two or more amino groups is at least one selected from the group consisting of ethylene diamine, diethylene triamine, dipropylene triamine, triethylene tetramine, tetraethylene pentaamine, 1,3-diamino propane, 1,4-diamino butane, 1,6-diamino hexane, 1,8-diamino octane, 1,10-diamino decane, 1,12-diamino dodecane, isophoronediamine, 1,6-cyclohexane diamine, piperazine, 2,5-diamino pyridine, 4,4'-diamino dicyclohexyl methane, 4,4'-diamino-3,3'-dimethyldiphenylmethane, 1,3-bis(aminoethyl)cyclohexane, xylylene diamine, methaphenylene diamine, and diamino diphenyl methane.

In addition, the present invention provides a capsule for a lithium-sulfur secondary battery, wherein the particle diameter of the capsule for the lithium-sulfur secondary battery is 0.3 to 2.0 μm.

In addition, the present invention provides a capsule for a lithium-sulfur secondary battery, wherein the weight ratio of the core and the shell is 10:90 to 70:30.

In addition, the present invention provides a lithium-sulfur secondary battery comprising the capsule for the lithium-sulfur secondary battery, a positive electrode, a negative electrode, a separator, and an electrolyte solution.

In addition, the present invention provides a method for preparing a capsule for a lithium-sulfur secondary battery, comprising the steps of dissolving a material required for formation and restoration of a solid electrolyte interface layer (SEI layer) and a crosslinking agent having two or more amino groups in water to prepare an aqueous phase portion, mixing the aqueous phase portion into an oil phase portion containing an oil phase component and a surfactant to prepare a water-in-oil emulsion solution, adding an epoxy compound having two or more epoxy groups to the water-in-oil emulsion solution to form an amine-epoxy crosslink, and removing the oil phase component from the water-in-oil emulsion solution, and drying the emulsion solution to obtain capsules.

In addition, the present invention provides a method for manufacturing a capsule for a lithium-sulfur secondary battery, wherein the material required for formation and restoration of the solid electrolyte interface layer (SEI layer) is at least one selected from the group consisting of $LiNO_3$, $Be(NO_3)_2$, $NaNO_3$, $Mg(NO_3)_2$, $Al(NO_3)_3$, $KNO_3$, $Ca(NO_3)_2$, $Sc(NO_3)_3$, $Ti(NO_3)_4$, $VO(NO_3)_3$, $Cr(NO_3)_3$, $Mn(NO_3)_2$, $Fe(NO_3)_3$, $Fe(NO_3)_2$, $Co(NO_3)_2$, $Co(NO_3)_3$, $Ni(NO_3)_2$, $Cu(NO_3)_2$, $Zn(NO_3)_2$, $Ga(NO_3)_3$, $RbNO_3$, $Sr(NO_3)_2$, $Y(NO_3)_3$, $Zr(NO_3)_4$, $Pd(NO_3)_2$, $AgNO_3$, $Cd(NO_3)_2$, $Sb(NO_3)_3$, $Xe(NO_3)_2$, $CsNO_3$, $Ba(NO_3)_2$, $Hg_2(NO_3)_2$, $Hg(NO_3)_2$, $Tl(NO_3)_3$, $TlNO_3$, $Pb(NO_3)_2$, $Bi(NO_3)_3$, $BiO(NO_3)$, $FrNO_3$, $Ra(NO_3)_2$, $La(NO_3)_3$, $Ce(NO_3)_3$, $Ce(NO_3)_4$, $Nd(NO_3)_3$, $Eu(NO_3)_3$, $Gd(NO_3)_3$, and $Tb(NO_3)_3$.

In addition, the present invention provides a method for preparing a capsule for a lithium-sulfur secondary battery, wherein the crosslinking agent having two or more amino groups is at least one selected from the group consisting of ethylene diamine, diethylene triamine, dipropylene triamine, triethylene tetramine, tetraethylene pentaamine, 1,3-diamino propane, 1,4-diamino butane, 1,6-diamino hexane, 1,8-diamino octane, 1,10-diamino decane, 1,12-diamino dodecane, isophoronediamine, 1,6-cyclohexane diamine, piperazine, 2,5-diamino pyridine, 4,4'-diamino dicyclohexyl methane, 4,4'-diamino-3,3'-dimethyldiphenylmethane, 1,3-bis(aminoethyl)cyclohexane, xylylene diamine, methaphenylene diamine, and diamino diphenyl methane.

In addition, the present invention provides a method for preparing a capsule for a lithium-sulfur secondary battery, wherein the oil phase component is at least one selected from decane, hexane, pentane, cyclopentane, benzene, toluene, o-xylene, m-xylene, p-xylene, diethyl ether, ethyl methyl ketone, dichloromethane, tetrahydrofuran, mineral oil, paraffin oil, and plant-derived oil.

In addition, the present invention provides a method for preparing a capsule for a lithium-sulfur secondary battery, wherein the surfactant has a hydrophilic/lipophilic balance (HLB) value of 1 to 6.

In addition, the present invention provides a method for preparing a capsule for a lithium-sulfur secondary battery, wherein the surfactant is at least one selected from the group consisting of Span™ 120 sorbitan isostearate, Span™ 83 sorbitan sesquioleate, Span™ 85 sorbitan ester, Span™ 80 sorbitan ester, Span™ 60 sorbitane monostearate, Span™ 40 sorbitan monopalmitate, Brij® 52 polyethylene glycol hexadecyl ether, Brij® 72 polyethylene glycol octadecyl ether, Brij® 93 polyethylene glycol oleyl ether, TRITON™ X-35 octylphenol ethoxylate and TRITON™ X-15 octylphenol ethoxylate.

In addition, the present invention provides a method for preparing a capsule for a lithium-sulfur secondary battery, wherein the epoxy compound having two or more epoxy groups is at least one selected from the group consisting of 1,4-butanediol diglycidyl ether (BDDE), ethylene glycol diglycidyl ether (EGDGE), 1,6-hexanediol diglycidyl ether, propylene glycol diglycidyl ether, poly(propylene glycol) diglycidyl ether, poly(tetramethylene glycol)diglycidyl ether, neopentyl glycol diglycidyl ether, trimethylolpropane triglycidyl ether, polyglycerol polyglycidyl ether, diglycerol polyglycidyl ether, glycerol polyglycidyl ether, trimethylolpropane polyglycidyl ether, 1,2-bis(2,3-epoxypropoxy)ethane, pentaerythritol polyglycidyl ether, or sorbitol polyglycidyl ether.

In addition, the present invention provides a method for preparing a capsule for a lithium-sulfur secondary battery, wherein the particle diameter of the capsule for the lithium-sulfur secondary battery is 0.3 to 2.0 μm.

In addition, the present invention provides a method for manufacturing a capsule for a lithium-sulfur secondary battery, wherein the weight ratio of the core and the shell is 10:90 to 70:30.

In addition, the present invention provides a capsule for a lithium-sulfur secondary battery, wherein the material required for formation and restoration of the solid electrolyte interface layer (SEI layer) is a metal nitrate.

In addition, the present invention provides a method for manufacturing a capsule for a lithium-sulfur secondary battery, wherein the material required for formation and restoration of the solid electrolyte interface layer (SEI layer) is a metal nitrate.

Advantageous Effects

The capsule for the lithium-sulfur secondary battery according to the present invention comprises a core containing a material required for formation and restoration of a solid electrolyte interface layer (SEI layer) and a shell made of a polymer surrounding the core and thus maintains the material required for formation and restoration of the solid electrolyte interface layer (SEI layer) at a constant level during operation of the battery, thereby exhibiting the effect of maintaining the solid electrolyte interface layer (SEI layer) on the negative electrode for a long time.

In addition, by using the capsule for lithium-sulfur secondary battery according to the present invention, the damage of the solid electrolyte interface layer (SEI layer) on the negative electrode is prevented even during the operation of the lithium-sulfur secondary battery, preventing the lithium metal from being exposed to the electrolyte solution and thus exhibiting the effects of suppressing a sudden drop in battery efficiency and suppressing the decrease in the discharging capacity of the battery, that is, exhibiting the effect of improving the lifetime characteristic of the lithium-sulfur secondary battery.

BEST MODE

The embodiments provided according to the present invention can all be achieved by the following description. It is to be understood that the following description describes preferred embodiments of the present invention, and it is to be understood that the present invention is not necessarily limited thereto.

The present invention provides a capsule for a lithium-sulfur secondary battery comprising a core containing a material (additive) required for formation and restoration of a solid electrolyte interface layer (SEI layer) and a shell made of a polymer surrounding the core.

The material required for formation and restoration of the solid electrolyte interface layer (SEI layer) may be at least one selected from $LiNO_3$, $Be(NO_3)_2$, $NaNO_3$, $Mg(NO_3)_2$, $Al(NO_3)_3$, $KNO_3$, $Ca(NO_3)_2$, $Sc(NO_3)_3$, $Ti(NO_3)_4$, $VO(NO_3)_3$, $Cr(NO_3)_3$, $Mn(NO_3)_2$, $Fe(NO_3)_3$, $Fe(NO_3)_2$, $Co(NO_3)_2$, $Co(NO_3)_3$, $Ni(NO_3)_2$, $Cu(NO_3)_2$, $Zn(NO_3)_2$, $Ga(NO_3)_3$, $RbNO_3$, $Sr(NO_3)_2$, $Y(NO_3)_3$, $Zr(NO_3)_4$, $Pd(NO_3)_2$, $AgNO_3$, $Cd(NO_3)_2$, $Sb(NO_3)_3$, $Xe(NO_3)_2$, $CSNO_3$, $Ba(NO_3)_2$, $Hg_2(NO_3)_2$, $Hg(NO_3)_2$, $Tl(NO_3)_3$, $TlNO_3$, $Pb(NO_3)_2$, $Bi(NO_3)_3$, $BiO(NO_3)$, $FrNO_3$, $Ra(NO_3)_2$, $La(NO_3)_3$, $Ce(NO_3)_3$, $Ce(NO_3)_4$, $Nd(NO_3)_3$, $Eu(NO_3)_3$, $Gd(NO_3)_3$, and $Tb(NO_3)_3$, and preferably may be lithium nitrate ($LiNO_3$).

In addition, the polymer may be formed by crosslinking an epoxy compound having two or more epoxy groups and a crosslinking agent having two or more amino groups.

Specifically, the shell made of a polymer surrounding the core may be formed by crosslinking an epoxy compound having two or more epoxy groups on the surface of the aqueous phase portion comprising the crosslinking agent having two or more amino groups. The shell formed as described above can prevent the material contained in the core and required for formation and restoration of the solid electrolyte interface layer (SEI layer) from being leached at once into the electrolyte solution, and the shell may allow the material required for formation and restoration of the solid electrolyte interface layer (SEI layer) swelled in the electrolyte solution and contained in the core to slowly leach into the electrolyte solution.

As a result, as the material required for formation and restoration of the solid electrolyte interface layer (SEI layer) is slowly leached into the electrolyte solution, it is possible to maintain the solid electrolyte interface layer (SEI layer) on the negative electrode for a long time.

In addition, the epoxy compound having two or more epoxy groups may be at least one selected from the group consisting of 1,4-butanediol diglycidyl ether (BDDE), ethylene glycol diglycidyl ether (EGDGE), 1,6-hexanediol diglycidyl ether, propylene glycol diglycidyl ether, poly(propylene glycol)diglycidyl ether, poly(tetramethylene glycol)diglycidyl ether, neopentyl glycol diglycidyl ether, trimethylolpropane triglycidyl ether, polyglycerol polyglycidyl ether, diglycerol polyglycidyl ether, glycerol polyglycidyl ether, trimethylolpropane polyglycidyl ether, 1,2-bis(2,3-epoxypropoxy)ethane, pentaerythritol polyglycidyl ether or sorbitol polyglycidyl ether, and preferably may be 1,4-butanediol diglycidyl ether (BDDE).

In addition, the crosslinking agent having two or more amino groups may be at least one selected from the group consisting of ethylene diamine, diethylene triamine, dipropylene triamine, triethylene tetramine, tetraethylene pentaamine, 1,3-diamino propane, 1,4-diamino butane, 1,6-diamino hexane, 1,8-diamino octane, 1,10-diamino decane, 1,12-diamino dodecane, isophoronediamine, 1,6-cyclohexane diamine, piperazine, 2,5-diamino pyridine, 4,4'-diamino dicyclohexyl methane, 4,4'-diamino-3,3'-dimethyldiphenylmethane, 1,3-bis(aminoethyl)cyclohexane, xylylene diamine, methaphenylene diamine, and diamino diphenyl methane, and preferably may be dipropylene triamine.

The particle diameter of the capsule for the lithium-sulfur secondary battery may be 0.3 to 2.0 μm, preferably 0.5 to 1.5 μm, and more preferably 0.7 to 1.2 μm. If the particle diameter of the capsule for the lithium-sulfur secondary battery is less than the above range, it is difficult to sufficiently leach the material contained in the core and required for formation and restoration of the solid electrolyte interface layer (SEI layer). If the particle diameter of the capsule for the lithium-sulfur secondary battery exceeds the above range, the material contained in the core and required for formation and restoration of the solid electrolyte interface layer (SEI layer) may be leached excessively at once. Therefore, it is preferable that the particle diameter of the capsule for lithium-sulfur secondary battery satisfies the above range.

In the capsule for the lithium-sulfur secondary battery, the weight ratio of the core and the shell may be 10:90 to 70:30, preferably 40:60 to 60:40, and more preferably 50:50 to 53:47. If the weight ratio of the core and the shell is less than the above range, since the shell does not sufficiently cover the core, the material contained in the core and required for formation and restoration of the solid electrolyte interface layer (SEI layer) may be leached excessively at once. If the weight ratio of the core and the shell exceeds the above range, it is difficult to sufficiently leach the material contained in the core and required for formation and restoration of the solid electrolyte interface layer (SEI layer). Therefore, it is preferable that the weight ratio of the core and the shell satisfies the above range.

In addition, the present invention provides a method for preparing a capsule for a lithium-sulfur secondary battery, comprising the steps of dissolving a material required for formation and restoration of a solid electrolyte interface layer (SEI layer) and a crosslinking agent having two or more amino groups in water to prepare an aqueous phase portion, mixing the aqueous phase portion into an oil phase portion containing an oil phase component and a surfactant to prepare a water-in-oil emulsion solution, adding an epoxy compound having two or more epoxy groups to the emulsion solution to form an amine-epoxy crosslink, and removing the oil phase component from the emulsion solution and drying it.

The material required for formation and restoration of the solid electrolyte interface layer (SEI layer) may be at least one selected from $LiNO_3$, $Be(NO_3)_2$, $NaNO_3$, $Mg(NO_3)_2$, $Al(NO_3)_3$, $KNO_3$, $Ca(NO_3)_2$, $Sc(NO_3)_3$, $Ti(NO_3)_4$, $VO(NO_3)_3$, $Cr(NO_3)_3$, $Mn(NO_3)_2$, $Fe(NO_3)_3$, $Fe(NO_3)_2$, $Co(NO_3)_2$, $Co(NO_3)_3$, $Ni(NO_3)_2$, $Cu(NO_3)_2$, $Zn(NO_3)_2$, $Ga(NO_3)_3$, $RbNO_3$, $Sr(NO_3)_2$, $Y(NO_3)_3$, $Zr(NO_3)_4$, $Pd(NO_3)_2$, $AgNO_3$, $Cd(NO_3)_2$, $Sb(NO_3)_3$, $Xe(NO_3)_2$, $CsNO_3$, $Ba(NO_3)_2$, $Hg_2(NO_3)_2$, $Hg(NO_3)_2$, $Tl(NO_3)_3$, $TlNO_3$, $Pb(NO_3)_2$, $Bi(NO_3)_3$, $BiO(NO_3)$, $FrNO_3$, $Ra(NO_3)_2$, $La(NO_3)_3$, $Ce(NO_3)_3$, $Ce(NO_3)_4$, $Nd(NO_3)_3$, $Eu(NO_3)_3$, $Gd(NO_3)_3$, and $Tb(NO_3)_3$, and preferably may be lithium nitrate ($LiNO_3$).

In addition, the epoxy compound having two or more epoxy groups may be at least one selected from the group consisting of 1,4-butanediol diglycidyl ether(BDDE), ethylene glycol diglycidyl ether(EGDGE), 1,6-hexanediol diglycidyl ether, propylene glycol diglycidyl ether, poly (propylene glycol)diglycidyl ether, poly(tetramethylene glycol)diglycidyl ether, neopentyl glycol diglycidyl ether, trimethylolpropane triglycidyl ether, polyglycerol polyglycidyl ether, diglycerol polyglycidyl ether, glycerol polyglycidyl ether, trimethylolpropane polyglycidyl ether, 1,2-bis(2,3-epoxypropoxy)ethane, pentaerythritol polyglycidyl ether, or sorbitol polyglycidyl ether, and preferably may be 1,4-butanediol diglycidyl ether (BDDE).

In addition, the crosslinking agent having two or more amino groups may be at least one selected from the group consisting of ethylene diamine, diethylene triamine, dipropylene triamine, triethylene tetramine, tetraethylene pentaamine, 1,3-diamino propane, 1,4-diamino butane, 1,6-diamino hexane, 1,8-diamino octane, 1,10-diamino decane, 1,12-diamino dodecane, isophoronediamine, 1,6-cyclohexane diamine, piperazine, 2,5-diamino pyridine, 4,4'-diamino dicyclohexyl methane, 4,4'-diamino-3,3'-dimethyldiphenylmethane, 1,3-bis(aminoethyl)cyclohexane, xylylene diamine, methaphenylene diamine, and diamino diphenyl methane, and preferably may be dipropylene triamine.

In addition, the oil phase component may be at least one selected from decane, hexane, pentane, cyclopentane, benzene, toluene, o-xylene, m-xylene, p-xylene, diethyl ether, ethyl methyl ketone, dichloromethane, tetrahydrofuran, mineral oil, paraffin oil, and plant-derived oil, and preferably may be paraffin oil.

In addition, the surfactant has a hydrophilic/lipophilic balance (HLB) value of 1 to 6 and preferably 3 to 5. Specifically, examples of the surfactant may be, but are not limited to, at least one selected from the group consisting of SPAN120, SPAN83, SPAN85, SPAN80, SPAN60, SPAN40, Brij52, Brij72, Brij93, Triton X35, and Triton X15.

In addition, the particle diameter of the capsule for the lithium-sulfur secondary battery prepared by the above preparing method may be 0.3 to 2.0 μm, preferably 0.5 to 1.5 μm, and more preferably 0.7 to 1.2 μm. If the particle diameter of the capsule for the lithium-sulfur secondary battery is less than the above range, it is difficult to sufficiently leach the material contained in the core and required for formation and restoration of the solid electrolyte interface layer (SEI layer). If the particle diameter of the capsule for the lithium-sulfur secondary battery exceeds the above range, the material contained in the core and required for formation and restoration of the solid electrolyte interface layer (SEI layer) may be leached excessively at once. Therefore, it is preferable that the particle diameter of the capsule for the lithium-sulfur secondary battery satisfies the above range.

Also, in the capsule for the lithium-sulfur secondary battery prepared by the above preparing method, the weight ratio of the core and the shell may be 10:90 to 70:30, preferably 40:60 to 60:40, and more preferably 50:50 to 53:47. If the weight ratio of the core and the shell is less than the above range, since the shell does not sufficiently cover the core, the material contained in the core and required for formation and restoration of the solid electrolyte interface layer (SEI layer) may be leached excessively at once. If the weight ratio of the core and the shell exceeds the above range, it is difficult to sufficiently leach the material contained in the core and required for formation and restoration of the solid electrolyte interface layer (SEI layer). Therefore, it is preferable that the weight ratio of the core and the shell satisfies the above range.

In addition, the present invention provides a lithium-sulfur secondary battery comprising the above-described capsule for the lithium-sulfur secondary battery, a positive electrode, a negative electrode, a separator, and an electrolyte solution.

Meanwhile, the present invention can also provide a battery module comprising the lithium-sulfur secondary battery as a unit cell and a battery pack including the same. The battery module or the battery pack may be used as a power source for any one or more medium and large-sized devices of a power tool; an electric vehicle including an electric vehicle (EV), a hybrid electric vehicle, and a plug-in hybrid electric vehicle (PHEV); or a power storage system, etc.

In addition, the capsule for the lithium-sulfur secondary battery may be contained in any one or more of the positive electrode, the negative electrode, the separator, and the electrolyte solution, and preferably may be contained in the electrolyte solution.

As the capsule for the lithium-sulfur secondary battery is contained in the electrolyte solution, the material contained in the core and required for formation and restoration of the solid electrolyte interface layer (SEI layer) is leached into the electrolyte solution during the operation of the battery and maintained at a constant concentration in the electrolyte solution, so that the solid electrolyte interface layer (SEI layer) on the negative electrode can be maintained at a constant level.

Hereinafter, a description of the positive electrode, the negative electrode, and the electrolyte solution applied to the lithium-sulfur secondary battery according to the present invention is added.

Positive Electrode

The positive electrode used in the present invention will be described below. After preparing a composition for the positive electrode containing the positive electrode active material, the electrically conductive material, and the binder, the slurry prepared by diluting such a composition in a predetermined solvent (disperse medium) can be directly coated and dried on a positive electrode current collector to form a positive electrode layer. Alternatively, after casting the slurry on a separate support, a film obtained by peeling from the support can be laminated on a positive electrode current collector to produce a positive electrode layer. In addition, the positive electrode can be manufactured in a variety of ways using methods well known to those skilled in the art.

The electrically conductive material not only serves as a path for electrons to move from the positive electrode current collector to the positive electrode active material, thereby imparting electronic conductivity, but also electrically connects the electrolyte and the positive electrode active material, thereby simultaneously serving as a path for lithium ions ($Li^+$) in the electrolyte solution to move to and react with sulfur. Therefore, if the amount of the electrically conductive material is insufficient or the electrically conductive material does not perform properly, the non-reacting portion of sulfur in the electrode is increased and eventually the reduction of capacity is caused. Also, the high rate discharging characteristics and the charging/discharging cycle lifetime are adversely affected. Therefore, it is necessary to add an appropriate amount of the electrically conductive material. The electrically conductive material is preferably added in an amount of 0.01 to 30% by weight based on the total weight of the composition for the positive electrode.

The electrically conductive material is not particularly limited as long as it has electrical conductivity without causing chemical changes in the battery, and for example, graphite; carbon blacks such as Denka black, acetylene black, Ketjen black, channel black, furnace black, lamp black, and thermal black; electrically conductive fibers such as carbon fibers and metal fibers; carbon fluoride; metal powders such as aluminum, and nickel powder; electrically conductive whiskers such as zinc oxide and potassium titanate; electrically conductive metal oxides such as titanium oxide; electrically conductive materials such as polyphenylene derivatives and the like can be used. Specific examples of commercially available and electrically conductive materials may comprise acetylene black series of products from Chevron Chemical Company or Denka black (Denka Singapore Private Limited), products form Gulf Oil Company, Ketjen black, EC series of products from Armak Company, products of Vulcan XC-72 from Cabot Company, and Super P (products from Timcal Company).

The binder is for attaching the positive electrode active material to the current collector well. The binder should be well dissolved in the solvent, and should not only constitute the conductive network between the positive electrode active material and the electrically conductive material, but also have a proper impregnation property into the electrolyte solution. The binder may be any binder known in the art, and specifically may be, but is not limited thereto, any one selected from the group consisting of fluororesin-based binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulose-based binders including carboxymethylcellulose (CMC), starch, hydroxypropylcellulose, and regenerated cellulose; polyalcohol-based binders; polyolefin-based binders including polyethylene and polypropylene; polyimide-based binders, polyester-based binders, silane-based binders and mixtures or copolymers of two or more thereof.

The content of the binder may be, but is not limited to, 0.5 to 30 wt. % based on the total weight of the composition for the positive electrode. If the content of the binder resin is less than 0.5 wt. %, the physical properties of the positive electrode may be deteriorated and thus positive electrode active material and the electrically conductive material can be broken away. If the content exceeds 30 wt. %, the ratio of the active material and the electrically conductive material in the positive electrode is relatively reduced and thus the battery capacity can be reduced and the content can act as a resistive element, reducing efficiency.

The composition for the positive electrode comprising the positive electrode active material, the electrically conductive material, and the binder may be diluted in a predetermined solvent and coated on a positive electrode current collector using a conventional method known in the art. First, a positive electrode current collector is prepared. The positive electrode current collector generally has a thickness of 3 to 500 μm. The positive electrode current collector is not particularly limited as long as it has a high electrical conductivity without causing chemical changes in the battery, and for example, may be stainless steel, aluminum, nickel, titanium, sintered carbon, or aluminum or stainless steel surface-treated with carbon, nickel, titanium, silver, or the like. The current collector can also increase the adhesive force of the positive electrode active material by forming fine irregularities on its surface and can be in various forms such as film, sheet, foil, net, porous body, foam, and non-woven fabric.

Next, a slurry obtained by diluting the composition for the positive electrode containing the positive electrode active material, the electrically conductive material, and the binder in a solvent is applied to the positive electrode current collector. The composition for the positive electrode containing the above-described positive electrode active material, electrically conductive material, and binder may be mixed with a predetermined solvent to prepare the slurry. At this time, the solvent should be easy to dry, and it is most preferable to be able to dissolve the binder well, but to keep the positive electrode active material and the electrically conductive material in a dispersed state without dissolving. If the solvent dissolves the positive electrode active material, since the specific gravity (D=2.07) of sulfur in the slurry is high, there is a tendency that the sulfur is submerged in the slurry, which in turn causes sulfur to flow into the current collector during coating and cause problems in the electrically conductive network, thereby causing problems with regard to the operation of the battery. The solvent (disperse medium) may be water or an organic solvent. The organic solvent may be at least one selected from the group consisting of dimethylformamide, isopropyl alcohol, acetonitrile, methanol, ethanol and tetrahydrofuran.

Subsequently, there is no particular limitation on the method of applying the composition for the positive electrode in the slurry state. For example, a coating layer may be prepared by a doctor blade coating method, a dip coating method, a gravure coating method, a slit die coating method, a spin coating method, a comma coating method, a bar coating method, a reverse roll coating method, a screen coating method, and a cap coating method, etc. Thereafter, in the composition for the positive electrode that has undergone such a coating process, evaporation of the solvent (disperse medium), compaction of the coating film and adhesion between the coating film and the current collector is achieved through a drying process. At this time, drying is performed according to a conventional method, and is not particularly limited.

Negative Electrode

As the negative electrode, any one capable of intercalation and deintercalation of lithium ions can be used. For example, metal materials such as lithium metal and lithium alloy, and carbon materials such as low crystalline carbon and high crystalline carbon can be exemplified. As the low crystalline carbon, soft carbon and hard carbon are typical. As the high crystalline carbon, high temperature sintered carbon such as natural graphite, Kish graphite, pyrolytic carbon, mesophase pitch-based carbon fiber, meso-carbon microbeads, mesophase pitches and petroleum or coal tar pitch derived cokes are typical. In addition, alloy series containing silicon, oxides such as $Li_4Ti_6O_{18}$ or the like are also well-known negative electrodes.

In this case, the negative electrode may comprise a binder. The binder may be various kinds of binder polymers such as polyvinylidenefluoride, polyvinylidenefluoride-hexafluoropropylene copolymer, polyacrylonitrile, polymethylmethacrylate, and styrene-butadiene rubber.

The negative electrode may optionally further comprise a negative electrode current collector for supporting the negative electrode active layer containing the negative electrode active material and the binder. The negative electrode current collector may be specifically selected from the group consisting of copper, stainless steel, titanium, silver, palladium, nickel, alloys thereof, and combinations thereof. The stainless steel may be surface-treated with carbon, nickel, titanium, or silver, and an aluminum-cadmium alloy may be used as an alloy. In addition, a sintered carbon, a nonconductive polymer surface-treated with a conductive material, or a conductive polymer may be used.

The binder serves to paste the negative electrode active material, to bond the active materials to each other, to bond the active material and the current collector, to buffer the expansion and contraction of the active material and so on. Specifically, the binder is the same as described above for the binder of the positive electrode. Also, the negative electrode may be lithium metal or lithium alloy. The non-limiting examples of the negative electrode may be a thin film of lithium metal, and may be an alloy of lithium and at least one metal selected from the group consisting of Na, K, Rb, Cs, Fr, Be, Mg, Ca, Sr, Ba, Ra, Al, and Sn.

Electrolyte Solution

The electrolyte solution comprises solvents and lithium salt, and if necessary, may further contain additives. The solvent can be used without particular limitation, as long as it is a conventional non-aqueous solvent that serves as a medium through which ions involved in the electrochemical reaction of the battery can move. Examples of the non-aqueous solvent may comprise carbonate-based solvents, ester-based solvents, ether-based solvents, ketone-based solvents, alcohol-based solvents, aprotic solvents and the like.

More specifically, examples of the carbonate-based solvent may comprise dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC), etc. Examples of the ester-based solvent may specifically comprise methyl acetate, ethyl acetate, n-propyl acetate, 1,1-dimethyl ethyl acetate, methyl propionate, ethyl propionate, γ-butyrolactone, decanolide, valerolactone, and mevalonolactone, carprolactone, etc. Examples of the ether-based solvent may specifically comprise diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, and polyethylene glycol dimethyl ether, etc. In addition, examples of the ketone-based solvent may comprise cyclohexanone, etc. Examples of the alcohol-based solvent may comprise ethylalcohol, and isopropylalcohol, etc. Examples of the aprotic solvent may comprise nitriles such as acetonitrile, amides such as dimethylformamide, dioxolanes such as 1,3-dioxolane (DOL), and sulfolane, etc. The non-aqueous organic solvents may be used alone or in combination of one or more. The mixing ratio when using in combination of one or more may be appropriately adjusted depending on the desired performance of the battery, and a solvent in which 1,3-dioxolane and dimethoxyethane are mixed in a volume ratio of 1:1 can be exemplified.

Hereinafter, preferred Examples are presented to help the understanding of the present invention, but the following examples are provided only to make the present invention easier to understand, and the present invention is not limited thereto.

Example 1

Preparation of Capsule for Lithium-Sulfur Secondary Battery 1.7 g of $LiNO_3$ as a material required for battery operation and 0.4 g of dipropylene triamine as a crosslinking agent having two or more amino groups were dissolved in 2.2 mL of water to prepare an aqueous phase portion. The prepared aqueous phase portion was mixed with an oil phase portion containing 88.5 g of paraffin oil as an oil phase component and 2.7 g of SPAN80 as a surfactant to prepare a water-in-oil emulsion solution. Thereafter, after the emulsion solution was heated to 50° C., 1.2 g of 1,4-butanediol diglycidyl ether as an epoxy compound having two or more epoxy groups was added, and an amine-epoxy crosslinking reaction was performed on the surface of the emulsion particles for 3 hours. After the cross-linking reaction, the paraffinic oil of the upper layer was removed from the emulsion solution, and the precipitated particles were recovered and washed 3 times with hexane to remove surfactant and residual paraffin oil. Thereafter, the particles were dried in air at room temperature and then vacuum dried at 80° C. for 12 hours to prepare a capsule for a lithium-sulfur secondary battery.

Manufacture of Coin Cell

Example 2-1

A positive electrode active material slurry prepared by mixing 90% by weight of sulfur, 5% by weight of carbon black, and 5% by weight of polyethylene oxide with acetonitrile was coated on an aluminum current collector and dried to prepare a positive electrode. In addition, a lithium metal having a thickness of 50 μm was used as a negative electrode. After positioning the prepared positive electrode and the negative electrode to face each other and interposing a polyethylene separator having a thickness of 20 μm therebetween, an electrolyte solution containing DOL/DME (1:1), 1M of $LiN(CF_3SO_2)_2$ (LiTFSI) and 1% by weight of the prepared capsule for lithium-sulfur secondary battery was charged to manufacture a lithium-sulfur secondary battery in a coin cell type.

Example 2-2

A lithium-sulfur secondary battery in a coin cell type was manufactured in the same manner as in Example 2-1, except that the capsule for the lithium-sulfur secondary battery was contained in an amount of 3% by weight.

Example 2-3

A lithium-sulfur secondary battery in a coin cell type was manufactured in the same manner as in Example 2-1, except that the capsule for the lithium-sulfur secondary battery was contained in an amount of 5% by weight.

Example 2-4

A lithium-sulfur secondary battery was prepared in the same manner as in Example 2-1, except that the form of the coin cell was changed to that of the pouch cell.

Example 2-5

A lithium-sulfur secondary battery in a pouch cell type was manufactured in the same manner as in Example 2-4, except that the capsule for the lithium-sulfur secondary battery was contained in an amount of 2% by weight.

Example 2-6

A lithium-sulfur secondary battery in a pouch cell type was manufactured in the same manner as in Example 2-4, except that the capsule for the lithium-sulfur secondary battery was contained in an amount of 3% by weight.

Example 2-7

A lithium-sulfur secondary battery in a pouch cell type was manufactured in the same manner as in Example 2-4, except that $LiNO_3$ was contained in the electrolyte solution in an amount of 3% by weight.

Comparative Example 2-1

A lithium-sulfur secondary battery in a coin cell type was prepared in the same manner as in Example 2-1, except that the capsule for the lithium-sulfur secondary battery was not added.

Comparative Example 2-2

A lithium-sulfur secondary battery in a coin cell type was prepared in the same manner as in Example 2-1, except that the capsule for the lithium-sulfur secondary battery was not added and $LiNO_3$ was contained in the electrolyte solution in an amount of 3% by weight.

Comparative Example 2-3

A lithium-sulfur secondary battery in a pouch cell type was prepared in the same manner as in Example 2-4, except that the capsule for the lithium-sulfur secondary battery was not added and $LiNO_3$ was contained in the electrolyte solution in an amount of 3% by weight.

Experimental Example 1

Measurement of Initial Discharging Capacity of Lithium-Sulfur Secondary Battery in Coin Cell Type In order to evaluate the performance of the lithium-sulfur secondary battery according to the presence or absence and content of the capsule for the lithium-sulfur secondary battery of the present invention, the capacities of the lithium-sulfur secondary batteries manufactured in Examples 2-1 to 2-3 and Comparative Examples 2-1 to 2-2, respectively, were measured from 1.8V to 2.5V at 25° C. using a charging/discharging measurement device.

Specifically, the first discharging capacity (initial discharging capacity) was measured by performing the charging/discharging at 0.1 C/0.1 C.

Figure 1:
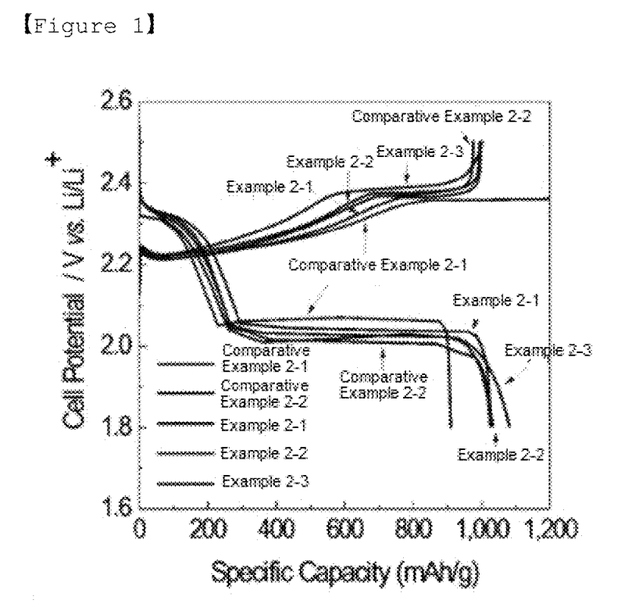
FIG. 1 is a graph showing the initial discharging capacities of lithium-sulfur secondary batteries in a coin cell type according to Examples 2-1 to 2-3 and Comparative Examples 2-1 to 2-2.

As a result, as shown in the graph of FIG. 1, it was confirmed that the lithium-sulfur secondary batteries of Examples 2-1 to 2-3 have higher discharging capacity than those of Comparative Examples 2-1 and 2-2.

Comparative Example 2-1 (without addition of $LiNO_3$) exhibits a charging delay phenomenon due to the shuttle effect of lithium polysulfide during charging.

Experimental Example 2

Evaluation of Lifetime Characteristic of Lithium-Sulfur Secondary Battery in the Form of a Coin Cell In order to evaluate the lifetime characteristics of the lithium-sulfur secondary batteries according to the presence or absence of the capsule for the lithium-sulfur secondary battery, the lithium-sulfur secondary batteries prepared in Example 2-2 and Comparative Examples 2-1 to 2-2, respectively, were charged/discharged at a current rate of 0.1 C/0.1 C 3 times, at 0.2 C/0.2 C 3 times, and thereafter at 0.3 C/0.5 C.

Figure 2:
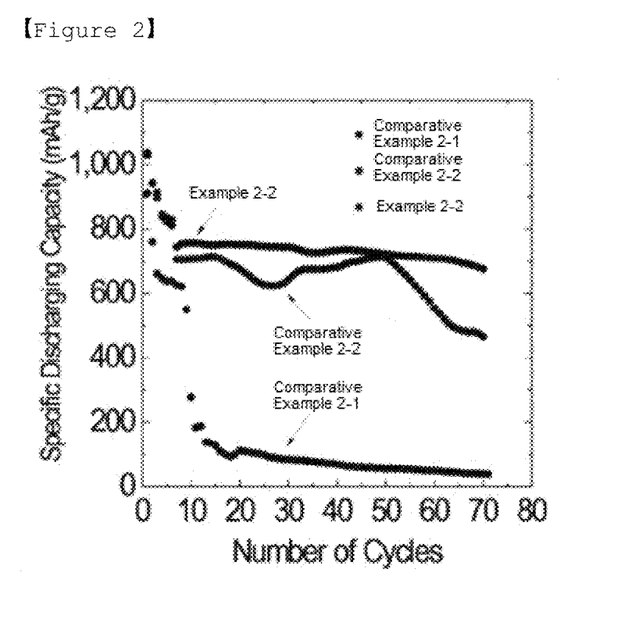
FIG. 2 is a graph showing the lifetime characteristics of lithium-sulfur secondary batteries in a coin cell type according to Example 2-2 and Comparative Examples 2-1 to 2-2.

The results are as shown in FIG. 2. That is, it was confirmed that the lithium-sulfur secondary battery of Example 2-2 comprising the capsule for the lithium-sulfur secondary battery according to the present invention has superior lifetime characteristic compared to Comparative Examples 2-1 and 2-2 that do not comprise the capsule for the lithium-sulfur secondary battery.

Experimental Example 3

Measurement of Fourth Discharge Capacity of Lithium-Sulfur Secondary Battery in the Form of a Pouch Cell In order to evaluate the performance of the lithium-sulfur secondary battery according to the presence or absence and content of the capsule for the lithium-sulfur secondary battery, the capacities of the lithium-sulfur secondary batteries manufactured in Examples 2-4 to 2-6 and Comparative Example 2-3, respectively, were measured from 1.8V to 2.5V at 30 using a charging/discharging measurement device.

Specifically, charging/discharging was initially performed three times at 0.1 C/0.1 C, and thereafter performed at 0.2 C/0.2 C. The fourth discharging capacity was measured.

Figure 3:
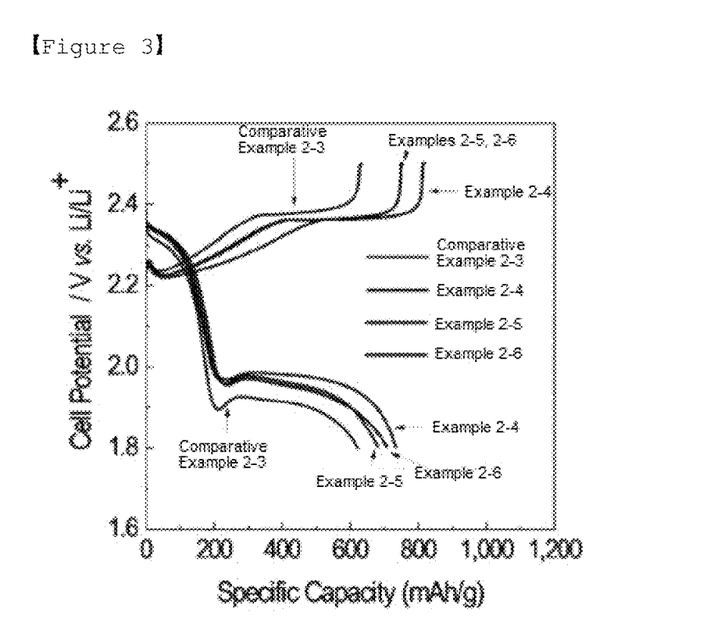
FIG. 3 is a graph showing the fourth discharge capacities of lithium-sulfur secondary batteries in a pouch cell type according to Examples 2-4 to 2-6 and Comparative Example 2-3.

As a result, as shown in FIG. 3, it was confirmed that the lithium-sulfur secondary batteries of Examples 2-4 to 2-6 have higher discharging capacity and average voltage than those of Comparative Example 2-3.

Experimental Example 4

Evaluation of Lifetime Characteristic of Lithium-Sulfur Secondary Battery in the Form of a Pouch Cell In order to evaluate the lifetime characteristics of the lithium-sulfur secondary batteries according to the presence or absence of the capsule for the lithium-sulfur secondary battery, the lithium-sulfur secondary batteries prepared in Examples 2-4 to 2-7 and Comparative Example 2-3, respectively, were charged/discharged initially at 0.1 C/0.1 C 3 times, and thereafter at 0.2 C/0.2 C to measure the discharging capacity according to the cycle.

Figure 4:
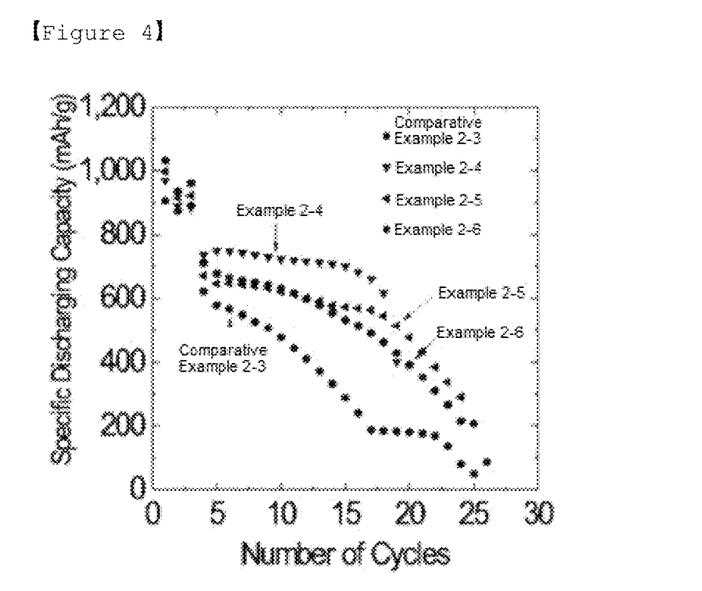
FIG. 4 is a graph showing the lifetime characteristics of lithium-sulfur secondary batteries in a pouch cell type according to Examples 2-4 to 2-6 and Comparative Example 2-3.
Figure 5:
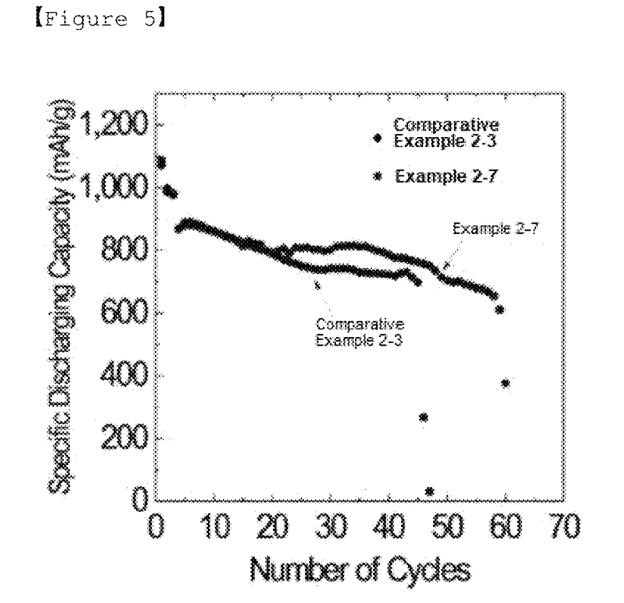
FIG. 5 is a graph showing the lifetime characteristics of the lithium-sulfur secondary batteries in a pouch cell type according to Example 2-7 and Comparative Example 2-3.

The results are as shown in FIGS. 4 and 5.

Specifically, it was confirmed that the lithium-sulfur secondary batteries of Examples 2-4 to 2-6 comprising the capsule for the lithium-sulfur secondary battery have superior lifetime characteristics compared to Comparative Example 2-3 that does not comprise the capsule for the lithium-sulfur secondary battery. In addition, it was confirmed that in the case of the lithium-sulfur secondary battery of Example 2-7, which comprise the capsule for the lithium-sulfur secondary battery and at the same time additionally contains $LiNO_3$ in the electrolyte solution, the lifetime characteristic is even better.

Experimental Example 5

Analysis of $LiNO_3$ Content in Capsule for Lithium-Sulfur Secondary Battery

The content of the additive ($LiNO_3$) in the capsule for the lithium-sulfur secondary battery prepared in Example 1 was measured using a thermogravimetric analysis (TA company, TGA Q500) under an air flow of 60 ml/min at a heating rate of 5° C./min.

Figure 6:
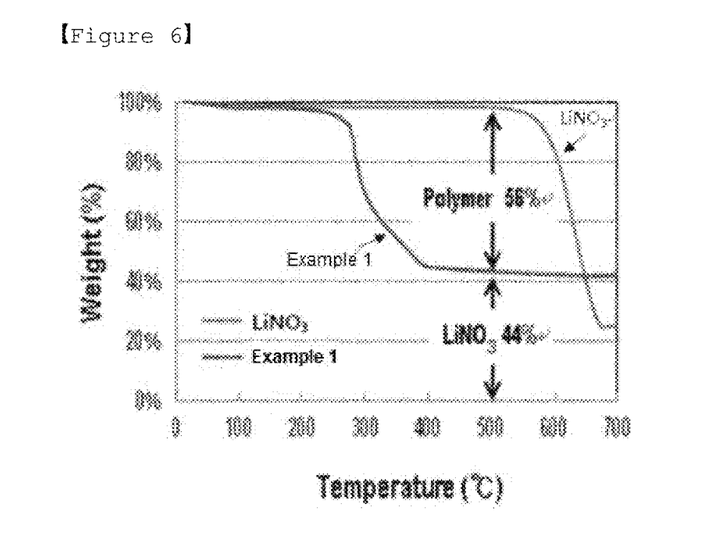
FIG. 6 is a graph showing thermogravimetric analysis of the capsule for the lithium-sulfur secondary battery according to Example 1.

As a result, as shown in FIG. 6, it was confirmed that in the case of the capsule for lithium-sulfur secondary battery according to Example 1, the polymer starts to decompose at 220° C., and the decomposition is completed at 400° C., so that the content of the polymer in the capsule is 56% by weight and the content of $LiNO_3$ is 44% by weight.

Experimental Example 6

Analysis of Shape and Size of Capsule for Lithium-Sulfur Secondary Battery

The shape and particle size of the capsule for the lithium-sulfur secondary battery prepared in Example 1 and pure $LiNO_3$ (additive) were observed using SEM (Hitachi, S-4800).

Figure 7:
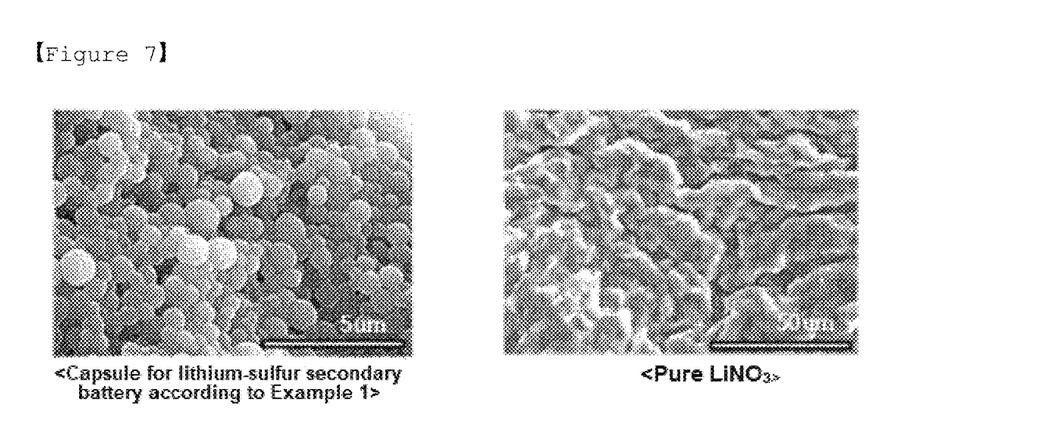
FIG. 7 is a SEM image of the capsule for the lithium-sulfur secondary battery according to Example 1 and pure $LiNO_3$.

As a result, as shown in FIG. 7, it was confirmed that the capsule for the lithium-sulfur secondary battery in Example 1 is a spherical particle with a size of 0.3~2.0 μM, unlike pure $LiNO_3$.

Experimental Example 7

Evaluation of Leaching Characteristic of Capsule for Lithium-Sulfur Secondary Battery In order to confirm the leaching characteristics of the capsule according to the present invention in the electrolyte solution, 1.5 g of the capsule for the lithium-sulfur secondary battery prepared in Example 1 was added to 50 g of the electrolyte solution, and then, 1 g of each electrolyte solution was collected at room temperature over time, and the Li content in the electrolyte solution was analyzed by ICP-OES (Perkinelmer, Optima 8300W) analysis to calculate the degree of leaching of the additive ($LiNO_3$).

As a result, as shown in Table 1, it was confirmed that in the case of the capsule for the lithium-sulfur secondary battery according to the present invention, $LiNO_3$ is slowly leached into the electrolyte solution compared to the case where the pure additive ($LiNO_3$) was added. Specifically, it was confirmed that in the case of the capsule for the lithium-sulfur secondary battery according to Example 1, only 19.7% of the additive ($LiNO_3$) contained in the original capsule is leached even after 21 days, unlike the case where the pure additive ($LiNO_3$) was added.

TABLE 1

| | Degree of leaching of additive (%) | | | | |
|---|---|---|---|---|---|
| | 0 day | 3 days | 7 days | 14 days | 21 days |
| Pure $LiNO_3$ | 100 | — | — | — | — |
| Capsule for lithium-sulfur secondary battery according to Example 1 | 2.3 | 14.0 | 18.3 | 18.7 | 19.7 |

All simple modifications and variations of the present invention shall fall within the scope of the present invention, and the specific protection scope of the present invention will be clarified by the appended claims.

The invention claimed is:

1. A capsule for a lithium-sulfur secondary battery comprising:
   a core comprising a material required for formation and restoration of a solid electrolyte interface layer (SEI layer); and
   a shell comprising a polymer surrounding the core,
   wherein the polymer is formed by crosslinking an epoxy compound having two or more epoxy groups and a crosslinking agent having two or more amino groups.

2. The capsule for the lithium-sulfur secondary battery according to claim 1, wherein the material required for formation and restoration of the solid electrolyte interface layer (SEI layer) is at least one selected from $LiNO_3$, $Be(NO_3)_2$, $NaNO_3$, $Mg(NO_3)_2$, $Al(NO_3)_3$, $KNO_3$, $Ca(NO_3)_2$, $Sc(NO_3)_3$, $Ti(NO_3)_4$, $VO(NO_3)_3$, $Cr(NO_3)_3$, $Mn(NO_3)_2$, $Fe(NO_3)_3$, $Fe(NO_3)_2$, $Co(NO_3)_2$, $Co(NO_3)_3$, $Ni(NO_3)_2$, $Cu(NO_3)_2$, $Zn(NO_3)_2$, $Ga(NO_3)_3$, $RbNO_3$, $Sr(NO_3)_2$, $Y(NO_3)_3$, $Zr(NO_3)_4$, $Pd(NO_3)_2$, $AgNO_3$, $Cd(NO_3)_2$, $Sb(NO_3)_3$, $Xe(NO_3)_2$, $CsNO_3$, $Ba(NO_3)_2$, $Hg_2(NO_3)_2$, $Hg(NO_3)_2$, $Tl(NO_3)_3$, $TlNO_3$, $Pb(NO_3)_2$, $Bi(NO_3)_3$, $BiO(NO_3)$, $FrNO_3$, $Ra(NO_3)_2$, $La(NO_3)_3$, $Ce(NO_3)_3$, $Ce(NO_3)_4$, $Nd(NO_3)_3$, $Eu(NO_3)_3$, $Gd(NO_3)_3$, and $Tb(NO_3)_3$.

3. The capsule for the lithium-sulfur secondary battery according to claim 1, wherein the epoxy compound having two or more epoxy groups is at least one selected from the group consisting of 1,4-butanediol diglycidyl ether (BDDE), ethylene glycol diglycidyl ether (EGDGE), 1,6-hexanediol diglycidyl ether, propylene glycol diglycidyl ether, poly(propylene glycol)diglycidyl ether, poly(tetramethylene glycol)diglycidyl ether, neopentyl glycol diglycidyl ether, trimethylolpropane triglycidyl ether, polyglycerol polyglycidyl ether, diglycerol polyglycidyl ether, glycerol polyglycidyl ether, trimethylolpropane polyglycidyl ether, 1,2-bis(2,3-epoxypropoxy)ethane, pentaerythritol polyglycidyl ether, or sorbitol polyglycidyl ether.

4. The capsule for the lithium-sulfur secondary battery according to claim 1, wherein the crosslinking agent having two or more amino groups is at least one selected from the group consisting of ethylene diamine, diethylene triamine, dipropylene triamine, triethylene tetramine, tetraethylene pentaamine, 1,3-diamino propane, 1,4-diamino butane, 1,6-diamino hexane, 1,8-diamino octane, 1,10-diamino decane, 1,12-diamino dodecane, isophoronediamine, 1,6-cyclohexane diamine, piperazine, 2,5-diamino pyridine, 4,4'-diamino dicyclohexyl methane, 4,4'-diamino-3,3'-dimethyldiphenylmethane, 1,3-bis(aminoethyl)cyclohexane, xylylene diamine, methaphenylene diamine, and diamino diphenyl methane.

5. The capsule for the lithium-sulfur secondary battery according to claim 1, wherein a particle diameter of the capsule for the lithium-sulfur secondary battery is 0.3 μm to 2.0 μm.

6. The capsule for the lithium-sulfur secondary battery according to claim 1, wherein a weight ratio of the core to the shell is 10:90 to 70:30.

7. The lithium-sulfur secondary battery comprising:
   a capsule for the lithium-sulfur secondary battery comprising:
   a core comprising a material required for formation and restoration of a solid electrolyte interface layer (SEI layer); and
   a shell comprising a polymer surrounding the core;
   a positive electrode;
   a negative electrode;
   a separator; and
   an electrolyte solution.

8. A method for preparing a capsule for a lithium-sulfur secondary battery, comprising the steps of:
   dissolving a material required for formation and restoration of a solid electrolyte interface layer (SEI layer) and a crosslinking agent having two or more amino groups in water to prepare an aqueous phase portion,
   mixing the aqueous phase portion into an oil phase portion comprising an oil phase component and a surfactant to prepare a water-in-oil emulsion solution,
   adding an epoxy compound having two or more epoxy groups to the water-in-oil emulsion solution to form an amine-epoxy crosslink, and
   removing the oil phase component from the water-in-oil emulsion solution and drying the emulsion solution to obtain capsules.

9. The method for preparing the capsule for the lithium-sulfur secondary battery according to claim 8, wherein the material required for formation and restoration of the solid electrolyte interface layer (SEI layer) is at least one selected from $LiNO_3$, $Be(NO_3)_2$, $NaNO_3$, $Mg(NO_3)_2$, $Al(NO_3)_3$, $KNO_3$, $Ca(NO_3)_2$, $Sc(NO_3)_3$, $Ti(NO_3)_4$, $VO(NO_3)_3$, $Cr(NO_3)_3$, $Mn(NO_3)_2$, $Fe(NO_3)_3$, $Fe(NO_3)_2$, $Co(NO_3)_2$, $Co(NO_3)_3$, $Ni(NO_3)_2$, $Cu(NO_3)_2$, $Zn(NO_3)_2$, $Ga(NO_3)_3$, $RbNO_3$, $Sr(NO_3)_2$, $Y(NO_3)_3$, $Zr(NO_3)_4$, $Pd(NO_3)_2$, $AgNO_3$, $Cd(NO_3)_2$, $Sb(NO_3)_3$, $Xe(NO_3)_2$, $CsNO_3$, $Ba(NO_3)_2$, $Hg_2(NO_3)_2$, $Hg(NO_3)_2$, $Tl(NO_3)_3$, $TlNO_3$, $Pb(NO_3)_2$, $Bi(NO_3)_3$, $BiO(NO_3)$, $FrNO_3$, $Ra(NO_3)_2$, $La(NO_3)_3$, $Ce(NO_3)_3$, $Ce(NO_3)_4$, $Nd(NO_3)_3$, $Eu(NO_3)_3$, $Gd(NO_3)_3$, and $Tb(NO_3)_3$.

10. The method for preparing the capsule for the lithium-sulfur secondary battery according to claim 8, wherein the crosslinking agent having two or more amino groups is at least one selected from the group consisting of ethylene diamine, diethylene triamine, dipropylene triamine, triethylene tetramine, tetraethylene pentaamine, 1,3-diamino propane, 1,4-diamino butane, 1,6-diamino hexane, 1,8-diamino octane, 1,10-diamino decane, 1,12-diamino dodecane, isophoronediamine, 1,6-cyclohexane diamine, piperazine, 2,5-diamino pyridine, 4,4'-diamino dicyclohexyl methane, 4,4'-diamino-3,3'-dimethyldiphenylmethane, 1,3-bis(aminoethyl)cyclohexane, xylylene diamine, methaphenylene diamine, and diamino diphenyl methane.

11. The method for preparing the capsule for the lithium-sulfur secondary battery according to claim 8, wherein the oil phase component is at least one selected from decane, hexane, pentane, cyclopentane, benzene, toluene, o-xylene, m-xylene, p-xylene, diethyl ether, ethyl methyl ketone, dichloromethane, tetrahydrofuran, mineral oil, paraffin oil, and plant-derived oil.

12. The method for preparing the capsule for the lithium-sulfur secondary battery according to claim 8, wherein the surfactant has a hydrophilic/lipophilic balance (HLB) value of 1 to 6.

13. The method for preparing the capsule for the lithium-sulfur secondary battery according to claim 8, wherein the surfactant is at least one selected from the group consisting of sorbitan isostearate, sorbitan sesquioleate, sorbitan ester, sorbitane monostearate, sorbitan monopalmitate, polyethylene glycol hexadecyl ether, polyethylene glycol octadecyl ether, polyethylene glycol oleyl ether, octylphenol ethoxylate and octylphenol ethoxylate.

14. The method for preparing the capsule for the lithium-sulfur secondary battery according to claim 8, wherein the epoxy compound having two or more epoxy groups is at least one selected from the group consisting of 1,4-butanediol diglycidyl ether (BDDE), ethylene glycol diglycidyl ether (EGDGE), 1,6-hexanediol diglycidyl ether, propylene glycol diglycidyl ether, poly(propylene glycol)diglycidyl ether, poly(tetramethylene glycol)diglycidyl ether, neopentyl glycol diglycidyl ether, trimethylolpropane triglycidyl ether, polyglycerol polyglycidyl ether, diglycerol polyglycidyl ether, glycerol polyglycidyl ether, trimethylolpropane polyglycidyl ether, 1,2-bis(2,3-epoxypropoxy)ethane, pentaerythritol polyglycidyl ether, or sorbitol polyglycidyl ether.

15. The method for preparing the capsule for the lithium-sulfur secondary battery according to claim 8, wherein a particle diameter of the capsule is 0.3 μm to 2.0 μm.

16. The method for preparing the capsule for the lithium-sulfur secondary battery according to claim 8, wherein a weight ratio of the core to the shell is 10:90 to 70:30.

17. The capsule for the lithium-sulfur secondary battery according to claim 1, wherein the material required for formation and restoration of the solid electrolyte interface layer (SEI layer) is a metal nitrate.

18. The method for preparing the capsule for the lithium-sulfur secondary battery according to claim 8, wherein the material required for formation and restoration of the solid electrolyte interface layer (SEI layer) is a metal nitrate.

* * * * *